E. SCHNEIDER.
APPARATUS FOR CONTROLLING THE RUDDERS OF SUBMARINES AND OTHER VESSELS.
APPLICATION FILED DEC. 28, 1915.

1,237,393.

Patented Aug. 21, 1917.
5 SHEETS—SHEET 2.

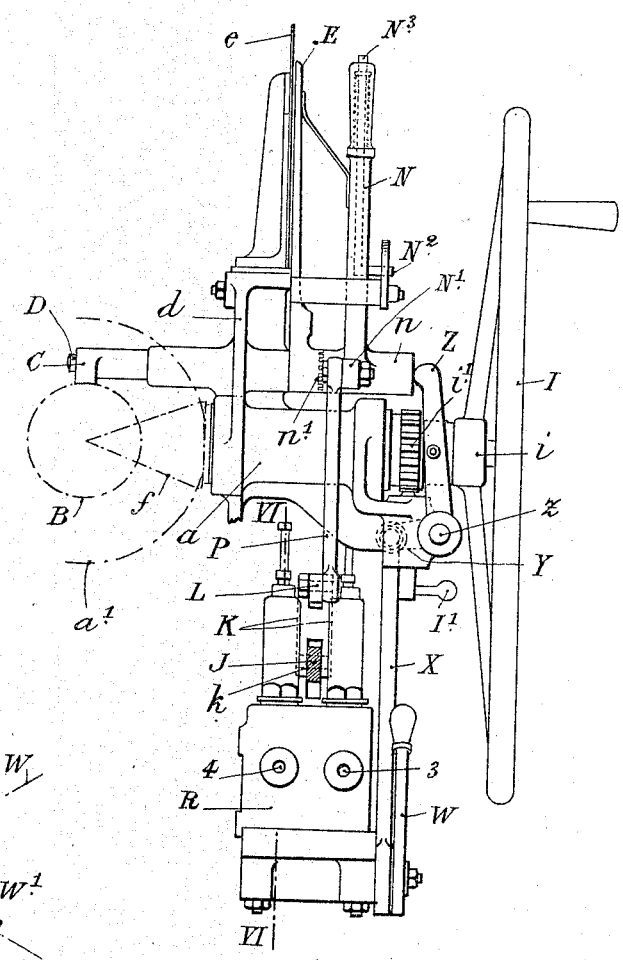

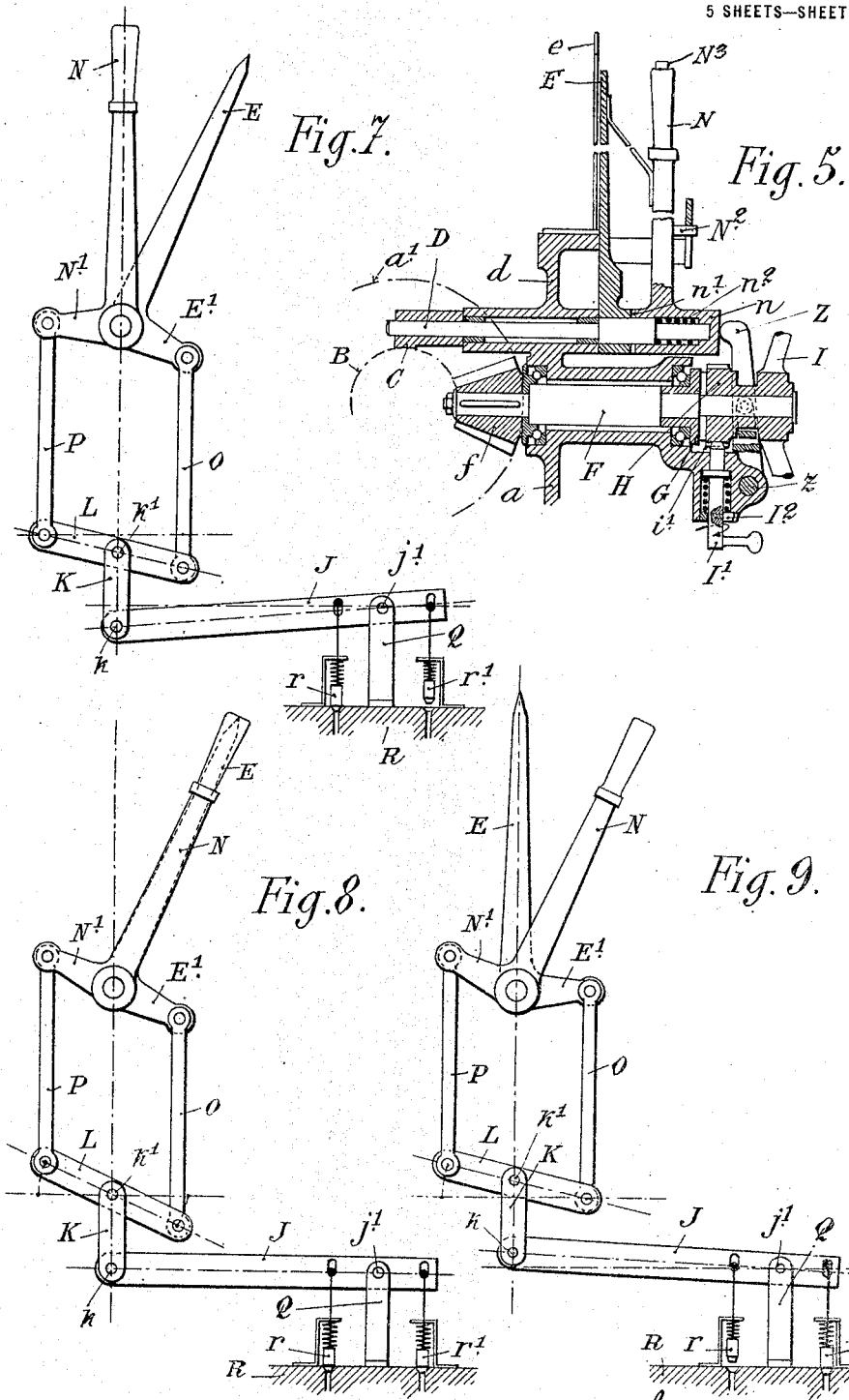

E. SCHNEIDER.
APPARATUS FOR CONTROLLING THE RUDDERS OF SUBMARINES AND OTHER VESSELS.
APPLICATION FILED DEC. 28, 1915.

1,237,393.

Patented Aug. 21, 1917.
5 SHEETS—SHEET 5.

UNITED STATES PATENT OFFICE.

EUGÈNE SCHNEIDER, OF LE CREUZOT, FRANCE.

APPARATUS FOR CONTROLLING THE RUDDERS OF SUBMARINES AND OTHER VESSELS.

1,237,393.   Specification of Letters Patent.   Patented Aug. 21, 1917.

Application filed December 28, 1915. Serial No. 69,102.

*To all whom it may concern:*

Be it known that I, EUGÈNE SCHNEIDER, a citizen of the Republic of France, residing at Le Creuzot, France, have invented a new and useful Improvement in Apparatus for Controlling the Rudders of Submarines and other Vessels, which is fully set forth in the following specification.

The usual installation for operating the rudders of a vessel such as a submarine comprises, as is well known, for each rudder the following three elements:—a power steering apparatus, a hand steering apparatus and an axiometer, that is to say, a device for indicating at all times the angle of inclination of the rudder.

In the installations hitherto known, those three elements are connected independently to the rudder, that is to say, the installation comprises motion-transmitting mechanism (hereinafter called a "connection" or "transmission") between the rudder and the power steering apparatus (of electrical or hydraulic type), an independent transmission for the hand steering apparatus, and an independent transmission between the rudder and the repeating pointer that serves for indicating the angle of inclination of the rudder.

Such installations are complicated and bulky. Moreover, the parts which are required to be operated and observed by the operator (namely, the hand steering wheel, the hand lever for operating the power steering distributer, and the pointer and dial of the axiometer) are more or less distant from one another, which circumstance is a source of fatigue for the operator and often requires an appreciable time or at least the conveying of an order to a distance from one operator to another for passing from power steering to hand steering and vice-versa. Further, when a rudder has been moved by the power steering apparatus into a determined position it will be held rigid in that position even when it is struck by heavy seas, so that the transmission must be made capable of withstanding strains that are sometimes very great.

The present invention does away with all the above stated drawbacks. It consists essentially in an association of the transmission provided between the rudder and the axiometer, with both the power steering control and hand steering control. The association between the axiometer pointer and the power steering control ensures a positive dependence of the two controls upon each other through the medium of the distributer of the power-steering apparatus. This dependence is such that the arrival of the pointer in the desired position of inclination will automatically interrupt the distribution, whereas it will allow the distributer to act in the case of a "racing" of the rudder, that is to say, when the rudder drives instead of being driven, the parts of the steering apparatus will return automatically into their initial position when the cause of the said racing or driving has ceased.

For steering by hand, a clutch is provided between the transmission for the axiometer and a hand steering wheel provided at the power steering station, this clutch being so constructed as to cut out the power steering apparatus when it is desired to steer by hand.

A practical construction of apparatus according to this invention is illustrated by way of example in the accompanying drawings. In this example it is assumed that the power steering of the rudder is effected by means of hydraulic power, a hydraulic distributer being provided between the axiometer pointer and the member for controlling the motive liquid. It is however to be understood that any other form (pneumatic, electric, etc.) of energy may be employed, the distributer and the conduits for the energy having alone to be suitably modified in such cases.

Figs. 2 to 9 illustrate the details of the axiometer which is associated in accordance with this invention with the controls of the power steering and with hand steering mechanisms.

Fig. 2 is a partial front elevation after removal of the hand steering wheel.

Fig. 3 is a plan thereof.

Fig. 4 is a side elevation.

Fig. 5 is a partial longitudinal section on the axis of the axiometer.

Fig. 6 is a section on the line VI—VI of Fig. 4.

Figs. 7, 8 and 9 illustrate the axiometer pointer and the hand lever for operating the distributer in three different positions of working.

Figure 1:
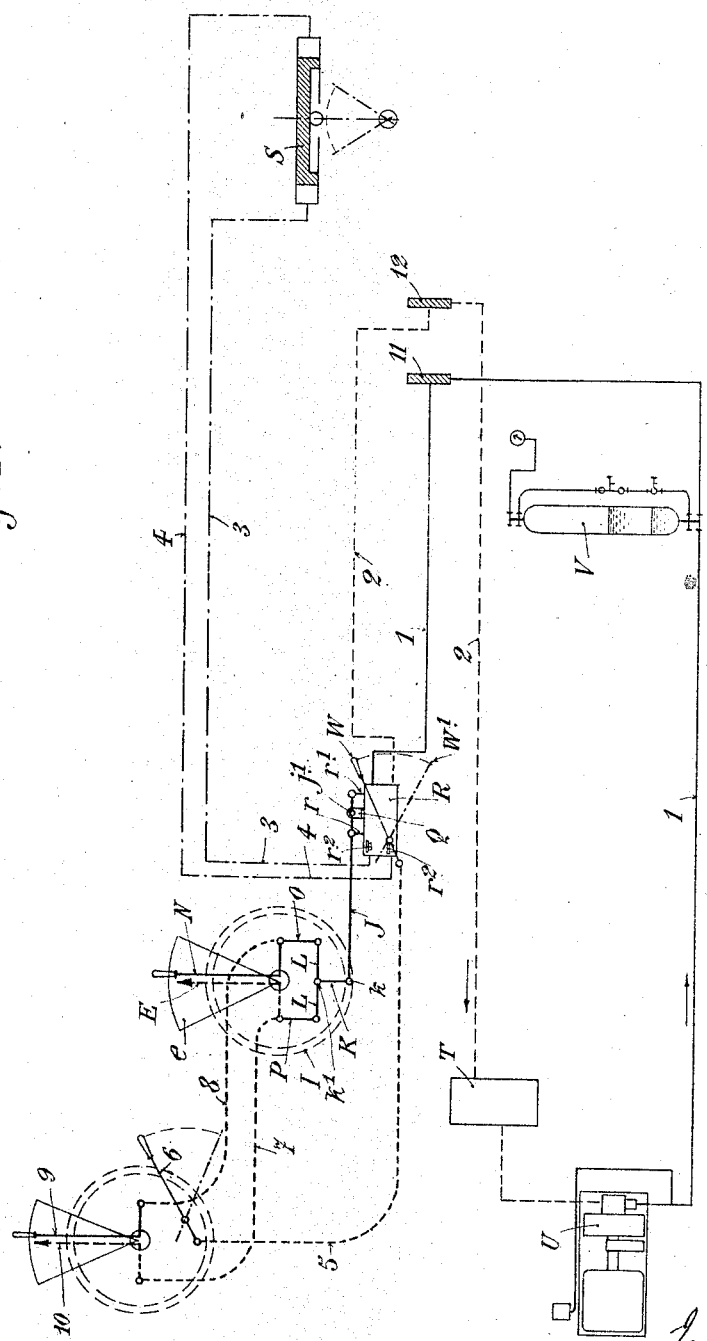
Figure 1 is a diagram illustrating the general arrangement of the improved apparatus.

In the example shown, the rudder is connected by suitable transmission to a shaft A (Fig. 3), journaled in a frame $a$. Connected to the shaft A is a suitable device for indicating the position of the rudder. As shown in the drawings, the shaft A has mounted on it a worm B engaging with a toothed sector C (Figs. 3, 4 and 5) keyed on the axle D (Fig. 5) which carries the pointer E of the axiometer. The axle D may be mounted in a bracket $d$ forming part of the framing $a$. This bracket may also support the dial $e$ of the axiometer.

Figure 3:
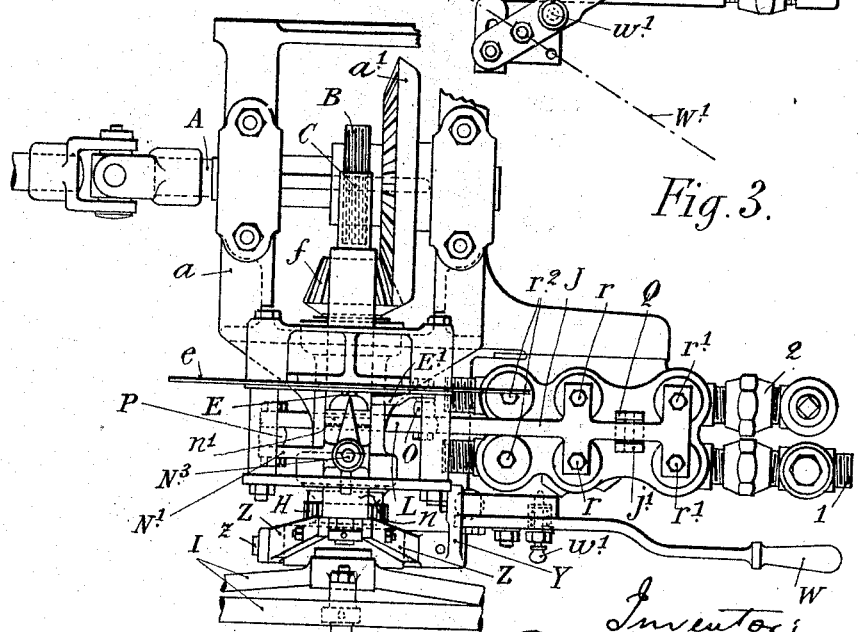
Figure 11:
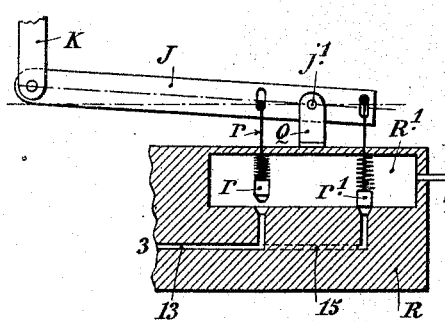
Fig. 11 is a cross-section on the line XI—XI of Fig. 10.
Figure 12:
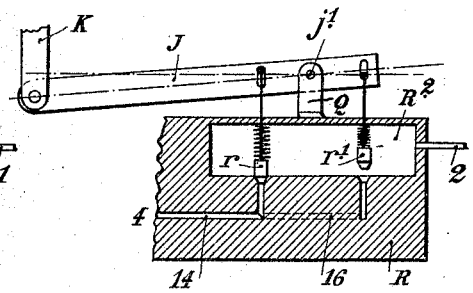
Fig. 12 is a cross-section on the line XII—XII of Fig. 10.
Figure 10:
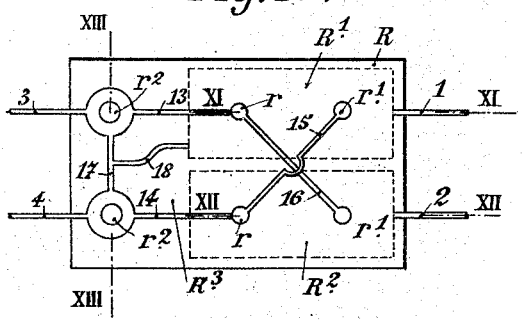
Fig. 10 is a diagrammatic plan view of the distributer.
Figure 13:
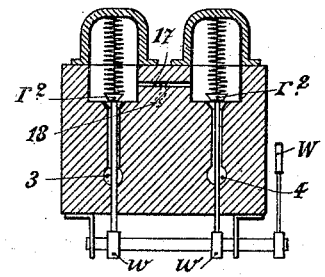
Fig. 13 is a cross-section on the line XIII—XIII of Fig. 10.

The association between the transmission A—B—C—D which operates the axiometer pointer E and the hand steering apparatus, is established for example as shown in Figs. 3 and 5, by means of a simple speed reducing gear comprising a bevel pinion $a^1$ keyed on the shaft A and a pinion $f$ keyed on a shaft F which is parallel to the axle D and is journaled in the framing $a$ in the same vertical plane as the axle D. On the shaft F is keyed one half G of a clutch, the other half H of which is fixed to the hub $i$ of the hand steering wheel I.

According as the clutch halves G and H are engaged with, or disengaged from each other, which is effected by sliding the hand wheel in the desired direction along the shaft F, the hand steering wheel I will be coupled to or uncoupled from the transmission that actuates the axiometer. This single transmission thus replaces the two separate transmissions employed in the installations hitherto known. A power means is also provided for moving the rudder, and, for the sake of illustration, a hydraulic power means is shown, that being the form which is deemed preferable. A governor for the power means is provided which, in the present case, is a distributer for controlling the flow of fluid.

In the example shown, the control of the distributer R for turning the rudder in one or the other direction, is produced by the rocking movements of a lever J. This lever is connected at its free end $j$ to one of the ends $k$ of a connecting rod K, the other end of which carries the pivot $k^1$ of a rocking beam L.

The association between the axiometer pointer E and the hand control lever N for operating the distributer, for the purpose stated, is established by the fact that those two parts are connected to the respective arms of the rocking beam L. For this purpose the hub $n$ of the hand lever N is mounted loosely on an extension of the axle D of the axiometer pointer, with the hub of which it may be connected by the engagement of claws $n^1$ in corresponding notches as hereinafter described. An arm $E^1$ projecting from the hub of the pointer E is connected by a connecting rod O to one of the arms of the rocking beam L. An arm $N^1$ projecting from the hub of the hand lever N is connected by a connecting rod P to the other arm of the said rocking lever. The arms $N^1$ and $E^1$ are of equal lengths, and the same is the case with the connecting rods O and P, so that the latter constitute with the rocking beam L three sides of a jointed parallelogram.

The distributing lever J is pivoted at $j^1$ to a bracket Q carried by the box R of the distributer. According as the lever J is caused to rock in one direction or the other on the axle $j^1$, it will act upon the needle valves $r$ or $r^1$ to admit the liquid under pressure to one or the other face of a press piston S (Fig. 1) connected by suitable transmission to the rudder. The face of the piston that does not receive the action of the pressure fluid communicates then with a suction box T in which there is no pressure and from which a pump U draws the liquid.

In the diagrammatic view of Fig. 1, 1 is a duct for conveying to the distributer box R the liquid under pressure coming from the pump U either directly or through the intermediary of an accumulator V; 2 is a duct for returning the liquid without pressure, connecting the distributer with the suction box T; 3 and 4 are the respective pipes that enable the faces of the press piston S to communicate through the distributer R alternately with the pipe 1 or the pipe 2.

A preferred construction of the distributer R is shown, somewhat diagrammatically, in Figs. 10, 11, 12 and 13. Within the box or frame of the distributer are two chambers, one, $R^1$, communicating through duct 1 with the accumulator V and the pump U; the other, $R^2$, communicating through duct 2 with the suction box T. Within each of these chambers are two ports, one port in each chamber being controlled by one of the needle valves $r$ and the other by one of the needle valves $r^1$. The ports controlled by the needle valves $r$ in said chambers $R^1$ and $R^2$ respectively lead to conduits 13 and 14 which respectively communicate with pipes 3 and 4. The ports controlled by the needle valves $r^1$ in said chambers $R^1$ and $R^2$ respectively lead to conduits 15 and 16, which respectively communicate with conduits 14 and 13. Pipes 3 and 4 are also provided with vertical branch conduits controlled respectively by spring-loaded valves $r^2$, the chambers of which are connected by by-pass 17. This latter conduit 17 also communicates with chamber $R^1$ through by-pass 18.

A device is provided whereby the rudder may be released from the control of the power means. The construction shown comprises a switch bar W which is pivoted to a fixed part, for instance to the box R, (Figs. 2, 3 and 4), and which by means of a connecting rod X and a crank Y drives an axle $z$ journaled in the framing $a$. This axle $z$ carries a fork Z, which engages in a groove in the hub $i$ of the hand wheel so as to be capable of causing axial movement of the latter; the branches of the fork bear with their outer ends against the hub $n$ of the hand lever N.

The bar W can be locked in its two extreme positions W and $W^1$ (Figs. 2 and 3) by means of an automatic spring locking device $w^1$. In its movements the bar W operates cams $w$ (Figs. 6 and 13) which are keyed on the axle of the bar. These cams act upon the two spring-loaded valves $r^2$ to raise and lower the same as appears clearly from the drawings. According as the bar is in the position W for hand steering, or in the position $W^1$ for power steering, the said valves are opened or closed. In Fig. 6 the valves $r^2$ are shown closed, the bar W being assumed to be in the position $W^1$, while in Fig. 13 they are shown open corresponding to the position of bar W shown in Fig. 2.

Figure 2:
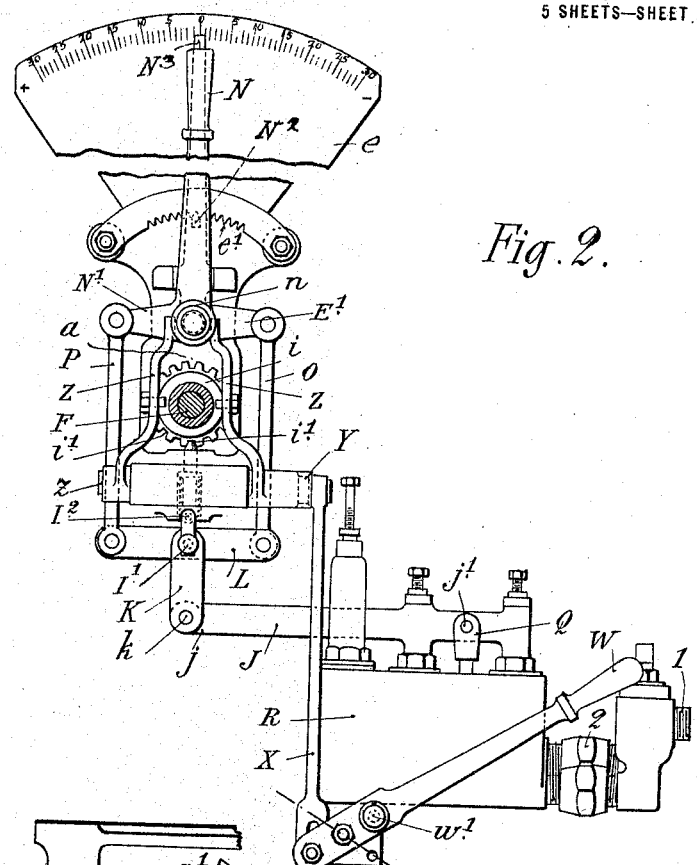

The described apparatus operates as follows:

When it is desired to steer the rudder by hand, the switch bar W is moved into the position it occupies in Figs. 2 and 4. The fork Z bearing against the hub $n$ and thus compressing the spring $n^2$, has engaged the hand lever N with the axiometer pointer E. At the same time the hand steering wheel I has become connected to the shaft F by means of the engagement established between the clutch halves H and G. The valves $r^2$ are open and allow the liquid to flow from one face of the press piston S through by-pass 17 to the other face of the press piston S which follows the movements of the rudder without resistance being offered by the liquid. In other words, the piston S is moved by the hand steered rudder, the liquid circulating in the closed circuit formed by the cylinder of the piston S, the pipes 3, 4, and the by-pass 17. Since the hand lever N and the axiometer pointer E are thus fixed relatively to each other, they are both moved by the transmission B—C in one or the other direction according to the direction in which the hand steering wheel I is operated. In these movements the distributing lever J and the connecting rod K remain stationary in the position shown in Fig. 2, the distributer being idle while the rocking beam L rocks on its pivot $k^1$ on the connecting rod K.

In order to avoid having to keep the hand steering wheel J by hand in the position in which it has been turned, a locking device may be provided such as the one shown in Fig. 5. On the framing $a$ is a spring bolt $I^1$ which can be moved at will out of or into the path of the hub $i$, in which latter position (shown in Fig. 5) it engages in notches $i^1$ formed in the hub $i$. During the turning of the hand steering wheel, the said bolt is kept in its inoperative position by pushing it down and turning a projection or spur $I^2$ with which it is provided, underneath the lower edge of the recess in which it is situated.

In order to pass from hand steering to power steering, it is merely necessary to move the switch bar W from the position W into the position $W^1$ (Figs. 2 and 6), whereupon the exhaust valves $r^2$ will close, the hand steering wheel I will become disconnected, and the spring $n^2$ will assure the disengagement of the hub $n$ of the hand lever N from the axle D upon which the hand lever N is thus rendered loose.

If on starting from the zero position in Figs. 2 and 5, during power steering the hand lever N be moved for instance opposite division 15 on the right of the dial $e$, the arm $N^1$ in turning will move with it the connecting rod P (Fig. 9), and through the latter the rocking beam L which will rock on its pivot on the connecting rod O, which latter has remained stationary. The rocking beam L thus raises the connecting rod K and the lever J of the distributer, and the lever J pivots on $j^1$ from idle position so as to lift the needle valves $r$ (see Figs. 9 and 11). The liquid under pressure from pump U passes through duct 1 to chamber $R^1$, whence it is admitted to conduit 13, and, through pipe 3, acts upon one face of press piston S. At the same time the liquid is withdrawn from the other face of the piston S through pipe 4, conduit 14, chamber $R^2$ and duct 2 to suction box T. The piston is thus moved to shift the rudder in the desired direction. This shifting of the rudder is followed by the pointer E which in coming opposite the hand lever N, acts by means of the arm $E^1$ and the connecting rod O upon the rocking beam L, and through the latter upon the connecting rod K and the lever J of the distributer. The latter is thus returned into its initial or "idle" position to close the needle valves $r$, as soon as the hand lever N and the pointer E come opposite each other. The rudder remains held at an angle of 15° by the pressure of the liquid which acts upon both sides of the press piston S (see Fig. 8).

If hand lever N be moved to the left of its zero position, its arm $N^1$ in turning will move connecting rod P and thereby rocking beam L upon its pivotal connection to connecting rod O. Connecting rod K is thereby depressed, lever J pivoted on its fulcrum $j^1$, and needle valves $r^1$ opened (see Fig. 12). The liquid under pressure from pump U passes through duct 1 to chamber $R^1$, whence it is admitted to conduit 15, and, through conduit 14 and pipe 4, acts upon one face of the press piston S. At the same time the liquid is withdrawn from the other face of the piston S through pipe 3, conduits 13 and 16, chamber $R^2$ and duct 2 to suction box T. Thus the piston is moved to shift the rudder in the opposite direction.

An automatic engagement between a spring catch $N^2$ carried by the hand lever N and a series of notches $e^1$ formed on a sector fixed to the dial $e$, corresponding in number to the degrees of graduation, allows of letting go the hand lever N as soon as the latter has arrived in the desired position. During the maneuvering of the rudder this catch is kept back by pressing upon the nob $N^3$ which compresses the spring of the catch.

Should a heavy sea strike the rudder the latter will be turned and will turn the pointer E with it. Assuming for instance that the hand lever N was at zero, the pointer E in moving relatively to the said hand lever (Fig. 7) will move with it through the connecting rod O the rocking beam L which pivots on its point of connection to the connecting rod P that has been held stationary. The connecting rod K moves down and causes the lever J to turn on its pivot on the bracket Q, and thus open the corresponding needle valves $r^1$ of the distributer. One of the two valves $r^2$, namely the valve for the pipe 3 for example or for the pipe 4, according to the direction of movement of the piston S, will open and allow the pressed liquid to return to the accumulator. Thus in the example stated, the shift of the rudder, represented by movement of pointer E to the right in Fig. 7, moves piston S to compress the liquid in pipe 4. When this pressure is sufficient to overcome the spring which presses the corresponding valve $r^2$ upon its seat, the latter will open, and the liquid will flow from pipe 4 through by-passes 17 and 18 to chamber R′, and thence back to the accumulator V. Should the rudder be driven in the opposite direction, the valve $r^2$ in the branch from pipe 3 will open to permit the flow of liquid through by-passes 17 and 18 to chamber $R^1$. The valves $r^2$ thus constitute a safety relief means which permits the rudder to be moved by an external force without breaking the normal mechanical connection to the power means.

When the cause of the turning of the rudder has disappeared, the valve $r^2$ which was open, will close again by the action of its spring (the force of which is adjustable). In the first example stated (see Fig. 7), owing to the fact that the needle valves $r^1$ of the distributer are open, the liquid under pressure will act upon the press piston S through the conduits 15 and 14 and pipe 4, and will turn the rudder automatically in the opposite direction until the pointer has returned into coincidence with the hand lever N which has not moved.

From the preceding it will be clearly perceived that the described apparatus has the following chief advantages over the installations hitherto in use:

1. The dependence between the power steering control and the axiometer pointer, which is one of the essential characteristic features of this invention, renders the power steering apparatus completely reversible and allows the rudder to become a motor when struck for instance by a heavy sea, thereby doing away with the strains due to the resistance of the mechanical transmission; the shifted rudder being then returned automatically into the position from which it has been shifted by the said heavy sea or other cause.

2. The engagement of the hand steering apparatus with the transmission connecting the rudder to the axiometer does away with one transmission.

3. The control of this engagement by a switch bar that effects at the same time a connection between the power steering hand lever and the axiometer pointer, allows, by its action upon a single member, a rapid change from power steering to hand steering and vice versa. This is extremely important for instance in the case of damage to the piping or other parts of the power steering apparatus, and in the case of stoppage of the pump or of the running down of the accumulator when steering by hydraulic power.

4. The association between the power steering apparatus, the axiometer and the hand steering apparatus has the result of enabling the parts that are to be operated and observed to be grouped at one station, and all within easy reach of the hand and under the direct observation of the operator.

Moreover, it is to be noted that in the particular construction hereinbefore described, the rapidity of maneuvering the rudder is proportional to the extent of opening of the valves of the distributer, and, consequently, to the amplitude of the rocking of the rocking beam L. The amplitude of the rocking of the rocking beam increases in proportion with the advance or lead of the power steering hand lever N in relation to the axiometer pointer E. Consequently, according to the rapidity with which it is desired to effect the maneuver it is possible either:

(1) To bring the power steering hand lever gradually to the required angle, while maintaining a suitable but reduced advance or lead of the hand lever in relation to the pointer; or (2) To move the power steering hand lever quickly by a single movement into the desired position; or (3) To cause the needle valve to rise through a distance that is greater than that corresponding to the intended final position of the power steering hand lever by moving such lever quickly to a position beyond such intended final position, whereby the rapidity is increased at the start, and then to return the power steering hand lever to the desired position toward the end of the maneuver.

Generally it will be seen that the hereinbefore described apparatus provides a very extended scale of speeds of maneuvering, and that a suitable regulation of the advance or lead of the hand lever in relation to the pointer will allow of reducing those speeds especially during the period of inclination when the rudder acts as a motor, that is to say, when it has a tendency to be shifted by the action of the water due to the travel of the vessel.

The general installation may, as indicated in the diagrammatic view of Fig. 1, comprise an auxiliary control station where a second operator may operate from a distance the rocking beam L of the main station, as well as the switch bar W. In such a case the switch bar is connected by a flexible transmission 5 (Fig. 1) to a control bar 6 at the auxiliary station, and the two arms of the rocking lever L or the power steering hand lever N and the axiometer pointer E are likewise connected by flexible connections 7 and 8 to a control member 9 and a repeating pointer 10 respectively.

It is obvious that the general installation for distributing the energy for maneuvering the rudder may easily comprise branch pipes terminating respectively at a pressure collector 11 placed on the pipe 1, and at a suction collector 12 placed on the pipe 2; these branch pipes being each connected to a distributer for the admission and exhaust of the pressure liquid intended for use in a series of a corresponding number of stations.

What I claim is:

1. In a rudder-controlling mechanism, the combination of power rudder-moving means, a device indicating the position of the rudder, a control lever, and a governor for the power means connected with the lever and with the indicating device whereby the movement of either independently of the other effects the application of power to the rudder.

2. In a rudder-controlling mechanism, the combination of power rudder-moving means, a device indicating the position of the rudder, a control lever, a governor for the power means connected with the lever and thereby movable out of its "idle" position, and a connection between the indicating device and the governor whereby movement of the rudder by the power means tends to restore the governor to its "idle" position.

3. In a rudder-controlling mechanism, the combination of power rudder-moving means, a pivoted pointer indicating the position of the rudder, a control lever pivoted coaxially with the pointer, and a governor for the power means connected with the lever and with the pointer whereby the movement of either independently of the other effects the application of power to the rudder.

4. In a rudder-controlling mechanism, the combination of power rudder-moving means, a pointer indicating the position of the rudder, a control lever, a governor for the power means connected with the lever and with the pointer whereby the movement of either independently of the other effects the application of power to the rudder, and a device for locking the lever and pointer against relative movement thus maintaining the governor in its "idle" position.

5. In a rudder-controlling mechanism, the combination of power rudder-moving means, a pointer indicating the position of the rudder, a control lever having its path of movement parallel to that of the pointer, and a governor for the power means connected with the lever and with the pointer whereby it is maintained in its "idle" position when the said pointer and lever are opposite each other and is moved out of its "idle" position when either of them is moved independently of the other.

6. In a rudder-controlling mechanism, the combination of a pointer indicating the position of the rudder, hydraulic rudder-moving means comprising a cylinder, a piston movable in the cylinder and two pipes respectively adapted to supply fluid under pressure to the cylinder at the two sides of the piston, a control lever, a pressure device, and a governor for the said rudder moving means comprising two valves adapted respectively to admit pressure from the pressure device to the pipes leading to the cylinder, the said governor being connected with the lever and with the indicating device whereby both valves are maintained closed when the said pointer and lever are opposite each other and whereby one of the valves is opened when relative movement between the pointer and the lever takes place in one direction and the other of the valves is opened when relative movement takes place in the other direction.

7. In a rudder-controlling mechanism, the combination of a pointer indicating the position of the rudder, hydraulic rudder-moving means comprising a cylinder, a piston movable in the cylinder and two pipes respectively connected with the cylinder at the two sides of the piston, a control lever, a pressure device, and a governor for the hydraulic means comprising pressure and return ducts connected with the pressure device and valves adapted to connect the pressure duct to either of the said pipes and to connect the return duct with the other of the said pipes, the said governor being connected with the lever and with the pointer whereby all of the valves are maintained closed when the said pointer and lever are opposite each other and whereby the pressure duct is connected with one pipe and the return duct with the other pipe when relative movement between the pointer and the lever takes place in one direction and the connections are reversed when relative movement takes place in the other direction.

8. In a rudder-controlling mechanism, the combination of power rudder-moving means, safety relief means permitting the rudder to be moved by an external force out of the position in which the power means tends to hold it, and automatic means for causing the power means to restore the rudder to normal position after any such movement.

9. In a rudder-controlling mechanism, the combination of power means for moving the rudder, a governor for the power means, safety relief means supplemental to the said governor permitting the rudder to be moved by an external force out of the position in which the power means tends to hold it, and automatic means acting upon the governor to cause the power means to restore the rudder to normal position after any such movement.

10. In a rudder-controlling mechanism, the combination of hydraulic rudder-moving means comprising a cylinder, a piston movable in the cylinder and two pipes respectively connected with the cylinder at the two sides of the piston, normally closed spring-pressed valves connected respectively with the said pipes, either of the valves being adapted to open to permit the rudder to be moved by an external force out of the position in which the piston tends to hold it, a pressure device, a governor for the hydraulic means comprising two valves adapted respectively to admit pressure from the pressure device to the pipes, and means whereby the said governor acts automaticaly after any movement of the rudder by an external force to open one of the last said valves to admit pressure to the cylinder and restore the rudder to normal position.

11. In a rudder-controlling mechanism, the combination of hydraulic rudder-moving means comprising a cylinder, a piston movable in the cylinder and two pipes respectively connected with the cylinder at the two sides of the piston, a by-pass, normally closed spring-pressed valves connecting the said by-pass respectively with the said pipes, either of the valves being adapted to open to permit the flow of fluid through the by-pass and thereby permit the rudder to be moved by an external force out of the position in which the piston tends to hold it, a pressure device, a governor for the hydraulic means comprising two valves adapted to admit pressure from the pressure device to the said pipes respectively, and means whereby the said governor acts automatically after any movement of the rudder by an external force to open one of the last said valves to admit pressure to the cylinder and restore the rudder to normal position.

12. In a rudder-controlling mechanism, the combination of hydraulic rudder-moving means comprising a cylinder, a piston movable in the cylinder and two pipes respectively connected with the cylinder at the two sides of the piston, a by-pass, normally closed spring-pressed valves respectively connecting the by-pass with the said pipes, either of the valves being adapted to open to permit the flow of fluid through the by-pass and thereby permit the rudder to be moved by an external force out of the position in which the piston tends to hold it, a pressure device, a governor for the hydraulic means comprising pressure and return ducts connected with the pressure device and valves adapted to connect the pressure duct to either of the said pipes and to connect the return duct with the other of the said pipes, and means whereby the said governor acts automatically after any movement of the rudder by an external force to connect one of the pipes to the pressure duct and the other to the return duct and thus restore the rudder to normal position.

13. In a rudder-controlling mechanism, the combination of a device having a mechanical connection with the rudder and serving to indicate the position thereof, hand-operated rudder-moving means connectible with the said mechanical connection, power rudder-moving means connected with the rudder independently of the said mechanical connection, and means for releasing the rudder from the control of the power means when the rudder is to be moved by the hand means.

14. In a rudder-controlling mechanism, the combination of a device having a mechanical connection with the rudder and serving to indicate the position thereof, hand-operated rudder-moving means connectible with the said mechanical connection, power rudder-moving means, a device for releasing the rudder from the control of the power means when the rudder is to be moved by the hand means, and a device for disconnecting the hand means when the rudder is to be moved by the power means.

15. In a rudder-controlling mechanism, the combination of a device having a mechanical connection with the rudder and serving to indicate the position thereof, hand-operated rudder-moving means connectible with the said mechanical connection, power rudder-moving means, and a mechanism for simultaneously releasing the rudder from the control of the power means and connecting the hand means with the said connection or for simultaneously bringing the rudder under the control of the power means and disconnecting the hand means from the said connection.

16. In a rudder-controlling mechanism, the combination of hand-operated rudder-moving means, hydraulic rudder-moving means comprising a cylinder, a piston movable in the cylinder and two pipes respectively connected with the cylinder at the two sides of the piston, a by-pass, normally closed valves respectively connecting the by-pass with the said pipes, a pressure device, a governor for the hydraulic means comprising valves adapted to connect the pressure device to either of the said pipes, and means for opening the first said valves when the rudder is to be moved by the hand means.

17. In a rudder-controlling mechanism, the combination of a device having a mechanical connection with the rudder and serving to indicate the position of the former, hand-operated rudder-moving means connectible with the said mechanical connection, power rudder-moving means comprising a cylinder, a piston movable in the cylinder and two pipes respectively connected with the cylinder at the two sides of the piston, a by-pass, normally closed valves respectively connecting the by-pass with the said pipes, a pressure device, a governor for the hydraulic means comprising valves adapted to connect the pressure device to either of the said pipes, and means for opening the first said valves when the rudder is to be moved by the hand means.

18. In a rudder-controlling mechanism, the combination of hand-operated rudder-moving means, power rudder-moving means comprising a cylinder, a piston movable in the cylinder and two pipes respectively connected with the cylinder at the two sides of the piston, a by-pass, normally closed valves respectively connecting the by-pass with the said pipes, a pressure device, a governor for the hydraulic means comprising two valves adapted to connect the pressure device to either of the said pipes, and a mechanism for simultaneously opening the first said valves and connecting the hand means with the rudder or for simultaneously closing the first said valves and disconnecting the hand means from the rudder.

19. In a rudder-controlling mechanism, the combination of hand-operated rudder-moving means, hydraulic rudder-moving means comprising a cylinder, a piston movable in the cylinder and two pipes respectively connected with the cylinder at the two sides of the piston, a by-pass, normally closed spring-pressed valves connecting the by-pass respectively with the said pipes, either of the valves being adapted to open to permit the flow of fluid through the by-pass and thereby permit the rudder to be moved by an external force out of the position in which the piston tends to hold it, a pressure device, a governor for the hydraulic means comprising pressure and return ducts connected with the pressure device and valves adapted to connect the pressure duct to either of the said pipes and to connect the return duct with the other of the said pipes, and means whereby the said governor acts automatically after the movement of the rudder by an external force to connect one of the pipes to the pressure and the other to the return duct and thus restore the rudder to normal position, and means for opening the first said valves when the rudder is to be moved by the hand means.

20. In a rudder-controlling mechanism, the combination of a device having a mechanical connection with the rudder and serving to indicate the position thereof, hand-operated rudder-moving means connectible with the said mechanical connection, power rudder-moving means, a governor for the power means, and a device for locking the governor in its "idle" position when the rudder is to be moved by the hand means.

21. In a rudder-controlling mechanism, the combination of a device having a mechanical connection with the rudder and serving to indicate the position thereof, hand-operated rudder-moving means connectible with the said mechanical connection, power rudder-moving means, a governor for the power means, a device for releasing the rudder from the control of the power means when the rudder is to be moved by the hand means, and a device for locking the governor in its "idle" position when the rudder is to be moved by the hand means.

22. In a rudder-controlling mechanism, the combination of hand-operated rudder-moving means, hydraulic rudder-moving means, a governor for the hydraulic means, a by-pass, a device for opening the by-pass to release the rudder from the control of the hydraulic means when the rudder is to be moved by the hand means, a device for locking the governor in its "idle" position when the rudder is to be moved by the hand means, and means for operating the two said devices simultaneously.

23. In a rudder-controlling mechanism, the combination of hand-operated rudder-moving means, hydraulic rudder-moving means, a governor for the hydraulic means, a device for disconnecting the hand means from the rudder when the rudder is to be moved by the hydraulic means, a device for releasing the rudder from the control of the hydraulic means when the rudder is to be moved by the hand means, and a device for locking the governor in its "idle" position when the rudder is to be moved by the hand means.

24. In a rudder-controlling mechanism, the combination of a device having a mechanical connection with the rudder and serving to indicate the position thereof, hand-operated rudder-moving means connectible with the said mechanical connection, power rudder-moving means, a governor for the power means, a device for disconnecting the hand means from the said connection when the rudder is to be moved by the power means, a device for releasing the rudder from the control of the power means when the rudder is to be moved by the hand means, and a device for locking the governor in its "idle" position when the rudder is to be moved by the hand means.

25. In a rudder-controlling mechanism, the combination of a hand-operated rudder-moving means, power rudder-moving means, a governor for the power means, a device for disconnecting the hand means from the rudder when the rudder is to be moved by the power means, a device for releasing the rudder from the control of the power means when the rudder is to be moved by the hand means, a device for locking the governor in its "idle" position when the rudder is to be moved by the hand means, and a common operating means for the three said devices.

26. In a rudder-controlling mechanism, the combination of hand-operated rudder-moving means having a mechanical connection with the rudder, power rudder-moving means, a control lever, a governor for the power means connected with the lever and with the connection from the hand means to the rudder whereby movement of either the lever or the connection independently of the other effects the application of power to the rudder, and a device for releasing the rudder from the control of the power means when the rudder is to be moved by the hand means.

27. In a rudder-controlling mechanism, the combination of a device having a mechanical connection with the rudder and serving to indicate the position thereof, a hand-operated rudder-moving means connectible with the said mechanical connection, power rudder-moving means, a control lever, a governor for the power means connected with the lever and with the indicating device whereby movement of either independently of the other effects the application of power to the rudder, and a device for releasing the rudder from the control of the power means when the rudder is to be moved by the hand means.

28. In a rudder-controlling mechanism, the combination of hand-operated rudder-moving means having a mechanical connection with the rudder, power rudder-moving means, a control lever, a governor for the power means connected with the lever and with the connection from the hand means to the rudder whereby movement of either the lever or the connection independently of the other effects the application of power to the rudder, a device for releasing the rudder from the control of the power means when the rudder is to be moved by the hand means, and a device for disconnecting the hand means from the said connection when the rudder is to be moved by the power means.

29. In a rudder-controlling mechanism, the combination of hand-operated rudder-moving means having a mechanical connection with the rudder, power rudder-moving means, a control lever, a governor for the power means connected with the lever and with the connection from the hand means to the rudder whereby movement of either the lever or the connection independently of the other effects the application of power to the rudder, a device for releasing the rudder from the control of the power means when the rudder is to be moved by the hand means, a device for disconnecting the hand means from the said connection when the rudder is to be moved by the power means, and means for operating the two said devices simultaneously.

30. In a rudder-controlling mechanism, the combination of hand-operated rudder-moving means having mechanical connection with the rudder, power rudder-moving means, a control lever, a governor for the power means connected with the lever and with the connection from the hand means to the rudder whereby movement of either the lever or the connection independently of the other effects the application of power to the rudder, and a device for locking the governor in its "idle" position when the rudder is to be moved by the hand means.

31. In a rudder-controlling mechanism, the combination of a device having a mechanical connection with the rudder and serving to indicate the position thereof, hand-operated rudder-moving means connectible with the said mechanical connection, power rudder-moving means, a control lever, a governor for the power means connected with the lever and with the indicating device whereby movement of either independently of the other effects the application of power to the rudder, and a device for locking the governor in its "idle" position when the rudder is to be moved by the hand means.

32. In a rudder-controlling mechanism, the combination of a pointer having a mechanical connection with the rudder and serving to indicate the position thereof, hand-operated rudder-moving means connectible with the said mechanical connection, power rudder-moving means, a control lever, a governor for the power means connected with the lever and with the pointer whereby movement of either independently of the other effects the application of power to the rudder, and a device for locking the lever and the pointer against relative movement when the rudder is to be moved by the hand means.

33. In a rudder-controlling mechanism, the combination of a hand-operated rudder-moving means having a mechanical connection with the rudder, power rudder-moving means, a control lever, a governor for the power means connected with the lever and with the connection from the hand means to the rudder whereby movement of either the lever or the connection independently of the other effects the application of power to the rudder, a device for releasing the rudder from the control of the power means when the rudder is to be moved by the hand means, and a device for locking the governor in its "idle" position when the rudder is to be moved by the hand means.

34. In a rudder-controlling mechanism, the combination of a device having a mechanical connection with the rudder and serving to indicate the position thereof, hand-operated rudder-moving means connectible with the said mechanical connection, power rudder-moving means, a control lever, a governor for the power means connected with the lever and with the indicating device whereby movement of either independently of the other effects the application of power to the rudder, a device for releasing the rudder from the control of the power means when the rudder is to be moved by the hand means, and a device for locking the governor in its "idle" position when the rudder is to be moved by the hand means.

35. In a rudder-controlling mechanism, the combination of a pointer having a mechanical connection with the rudder and serving to indicate the position thereof, hand-operated rudder-moving means connectible with the said mechanical connection, power rudder-moving means, a control lever, a governor for the power means connected with the lever and with the pointer whereby movement of either independently of the other effects the application of power to the rudder, a device for releasing the rudder from the control of the power means when the rudder is to be moved by the hand means, and a device for locking the lever and the pointer against relative movement when the rudder is to be moved by the hand means.

36. In a rudder-controlling mechanism, the combination of a device having a mechanical connection with the rudder and serving to indicate the position thereof, hand-operated rudder-moving means connectible with the said mechanical connection, power rudder-moving means, a control lever, a governor for the power means connected with the lever and with the indicating device whereby movement of either independently of the other effects the application of power to the rudder, a device for releasing the rudder from the control of the power means when the rudder is to be moved by the hand means, a device for locking the governor in its "idle" position when the rudder is to be moved by the hand means, and means for operating the last two said devices simultaneously.

37. In a rudder-controlling mechanism, the combination of hand-operated rudder-moving means having a mechanical connection with the rudder, power rudder-moving means, a control lever, a governor for the power means connected with the lever and with the connection from the hand means to the rudder whereby movement of either the lever or the connection from the hand means independently of the other effects the application of power to the rudder, a device for disconnecting the hand means from the said connection when the rudder is to be moved by the power means, a device for releasing the rudder from the control of the power means when the rudder is to be moved by the hand means, and a device for locking the governor in its "idle" position when the rudder is to be moved by the hand means.

38. In a rudder-controlling mechanism, the combination of hand-operated rudder-moving means having a mechanical connection with the rudder, power rudder-moving means, a control lever, a governor for the power means connected with the lever and with the connection from the hand means to the rudder whereby movement of either the lever or the connection from the hand means independently of the other effects the application of power to the rudder, a device for disconnecting the hand means from the said connection when the rudder is to be moved by the power means, a device for releasing the rudder from the control of the power means when the rudder is to be moved by the hand means, a device for locking the governor in its "idle" position when the rudder is to be moved by the hand means, and means for operating the three said devices simultaneously.

39. In a rudder-controlling mechanism, the combination of power rudder-moving means, a device indicating the position of the rudder, a control lever, a governor for the power means, and connections between said indicating device and lever and said governor whereby movement of either said indicating device or said lever independently of the other effects the application of power to the rudder and whereby movement of said rudder tends to restore said indicating device and lever to normal relation.

40. In a rudder-controlling mechanism, the combination of hydraulic rudder-moving means, a governor therefor, hand-operated rudder-moving means, a by-pass, a device for opening said by-pass to release the rudder from the control of the hydraulic means when the rudder is to be moved by the hand means, and a device for locking the governor in its "idle" position when the rudder is to be moved by the hand means.

41. In a rudder-controlling mechanism, the combination of power rudder-moving means, a governor therefor, hand-operated rudder-moving means, a device for releasing the rudder from the control of the power means when the rudder is to be moved by the hand means, a device for connecting the hand means with the rudder when the rudder is to be moved by the hand means, a device for locking the governor in its "idle" position when the rudder is to be moved by the hand means, and means for operating the three said devices simultaneously.

42. In a rudder-controlling mechanism, the combination of power rudder-moving means, safety relief means permitting the rudder to be moved by an external force out of the position in which the power means tends to hold it, a device indicating the position of the rudder, automatic means for causing the power means to restore the rudder to normal position after any such movement, and a controlling lever for said automatic means.

43. In a rudder-controlling mechanism, the combination of power rudder-moving means, a governor for said power means, safety relief means supplemental to said governor permitting the rudder to be moved by an external force out of the position in which the power means tends to hold it, a device indicating the position of the rudder, automatic means acting on said governor for causing the power means to restore the rudder to normal position after any such movement, and a controlling lever for said automatic means.

44. In a rudder-controlling mechanism, the combination of power rudder-moving means, a device indicating the position of the rudder, a control lever, a governor for the power means, safety relief means supplemental to said governor permitting the rudder to be moved by an external force out of the position in which the power means tends to hold it, and connections between the said governor and the said indicating means and lever whereby the movement of said indicating means corresponding with such movement of the rudder acts upon said governor to cause said power means to restore the rudder to normal position after such movement has ceased.

45. In a rudder-controlling mechanism, the combination of power rudder-moving means, a pointer indicating the position of the rudder, a control lever pivoted coaxially with the pointer, a governor for said power means connected with said lever, hand-operated means connectible with the rudder and positioned adjacent said lever, and means for connecting said hand means to the rudder and locking said governor in "idle" position.

46. In a rudder-controlling mechanism, the combination of power rudder-moving means, a pointer indicating the position of the rudder, a control lever pivoted coaxially with the pointer, a governor for said power means connected with said lever, hand-operated means adjacent said lever, a clutch for connecting said hand means to the rudder, means whereby said lever may be locked to said pointer and said governor maintained in "idle" position, and a single means for operating said clutch and said locking means.

47. In a rudder-controlling mechanism, the combination of power rudder-moving means, a pointer indicating the position of the rudder, a control lever pivoted coaxially with the pointer, a governor for said power means connected with said lever, hand-operated means connectible with the rudder and positioned adjacent said lever, means for connecting said hand means to the rudder and locking said governor in "idle" position, and means releasing the rudder from the control of the power means when the hand means is connected to the rudder.

In testimony whereof, I have signed this specification in the presence of two subscribing witnesses.

EUGÈNE SCHNEIDER.

Witnesses:
CHAS. P. PRESSLY,
G. F. WADLEY.

Copies of this patent may be obtained for five cents each, by addressing the "Commissioner of Patents, Washington, D. C."